United States Patent
Chang et al.

(10) Patent No.: US 10,391,473 B1
(45) Date of Patent: Aug. 27, 2019

(54) POLYMER-PROTECTED SORBENT

(71) Applicant: Electric Power Research Institute, Inc., Palo Alto, CA (US)

(72) Inventors: Ramsay Chang, Mountain View, CA (US); Joseph A. Swisher, Berkeley, CA (US); Timothy G. Ebner, Westminster, CO (US); Kevin M. Fisher, Highlands Ranch, CO (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 15/436,700

(22) Filed: Feb. 17, 2017

Related U.S. Application Data

(60) Provisional application No. 62/297,853, filed on Feb. 20, 2016.

(51) Int. Cl.
*B01J 20/28* (2006.01)
*B01J 20/20* (2006.01)
*B01J 20/18* (2006.01)
*B01J 20/12* (2006.01)

(52) U.S. Cl.
CPC ........... *B01J 20/2805* (2013.01); *B01J 20/12* (2013.01); *B01J 20/18* (2013.01); *B01J 20/20* (2013.01); *B01J 20/28026* (2013.01); *B01J 20/28035* (2013.01)

(58) Field of Classification Search
CPC ........ B01J 20/28; B01J 20/2805; B01J 20/12; B01J 20/18; B01J 20/20; B01J 20/28026; B01J 20/28035
USPC .................................................. 502/401, 402
See application file for complete search history.

(56) References Cited

U.S. PATENT DOCUMENTS

| | | | |
|---|---|---|---|
| 4,665,050 A | * 5/1987 | Degen ................ | B01J 20/28004 210/496 |
| 2010/0230346 A1 | * 9/2010 | Eisen ....................... | C08F 8/14 210/290 |

* cited by examiner

*Primary Examiner* — Edward M Johnson
(74) *Attorney, Agent, or Firm* — Owens Law Firm, PC

(57) ABSTRACT

The invention is directed to a polymer-protected sorbent that is at least partially covered by, or in contact with, a polymer that acts to protect or shield the sorbent from the surrounding environment, such as a liquid or gas stream within which the sorbent is being used. The sorbent is a sorbent material made of sorbent particles and can be used to remove certain chemical species, such as trace level toxic species, from a given liquid or gas, such as a liquid or gas stream in an industrial process, such as wet flue gas desulfurization process or a wastewater treatment process.

18 Claims, 4 Drawing Sheets

Schematic of a polymer protected sorbent ball.

Schematic of protected sorbent balls floating on the slurry tank in a wet FGD.

Schematic of protected sorbent balls in a bubbling bed wet FGD.

Schematic of protected sorbent balls in turbulent contact cages in a wet FGD.

POLYMER-PROTECTED SORBENT

BACKGROUND OF THE INVENTION

Background of the Invention

The invention and its various embodiments relate to a polymer-protected sorbent for capturing certain chemical species in liquid and gas streams, such as trace level toxic species. Specifically, the invention and its various embodiments relate to a sorbent material having a polymer that covers at least a portion of the sorbent that can be used to capture trace level toxic species, such as mercury, selenium, and other toxic species from various industrial processes, such as wet flue gas desulfurization or wastewater treatment systems.

Description of Related Art

Controlling emissions of certain gaseous pollutants, such as acid gases and air toxics, in flue gases generated from combustion devices, such as coal-fired power plants, is an important concern. In such flue gases, certain air toxics and other species can be distributed in both a gaseous phase and a liquid phase, thereby requiring the removal of such species from both a liquid environment and a gaseous environment. Further, certain air toxics, e.g., mercury, are typically present in a gaseous phase at such low concentrations that removal is difficult.

One approach for removing mercury from coal-fired power plant emissions is to capture mercury inside a wet flue gas desulfurization (wFGD) unit. For example, mercury can be absorbed from any liquid inside the scrubber that contains mercury, such as scrubber water. However, such an approach will only capture liquid-soluble oxidized mercury species or compounds. Elemental mercury in a gaseous or vapor phase will not be captured and will therefore be emitted into the atmosphere when the flue gas stream exits the scrubber. Furthermore, oxidation of elemental mercury is not always stable. Absorbed oxidized mercury can also be reduced and released again as elemental mercury in a process known as emission.

Sorbents are sometimes used to remove certain pollutants from gas streams. For example, sorbents may be injected into a gas stream and collected downstream after adsorbing a targeted contaminant. Alternatively, a packed bed, an entrained bed, or fluidized bed may use a sorbent to adsorb a given pollutant from a gas stream. Solid sorbents such as activated carbon can be used to adsorb mercury in a gaseous phase. For example, mercury sorbents can be injected into the flue gas stream before it enters the scrubber or, alternatively, added after the scrubber as part of a fixed structure, such as a carbon honeycomb. However, solid mercury sorbents can be quickly de-activated by liquid water and thus lose their affinity for mercury adsorption. Another challenge of using a solid sorbent is to ensure adequate contact between the gaseous elemental mercury and the sorbent itself, while minimizing the complexity and expense of such a contacting scheme. Placing a sorbent structure that is made of or contains sorbent, such as a carbon honeycomb, downstream of a wFGD unit requires significant space and supporting structures that would be very difficult to implement, in addition to being expensive.

An additional example of a sorbent structure that contains sorbent for adsorbing mercury is one or more polymer sheets or modules placed inside near the exit of the flue gas stream from the FGD unit to maximize their chances of capturing mercury exiting the structure. However, the interior of the FGD is a corrosive environment, and, as a result, the modules require significant structural support with corrosion-resistant materials in order to function effectively. The location of such modules near the exit of the FGD also makes it operationally difficult to access and replace them quickly, if needed.

In view of the foregoing, there is a need for a cost-effective sorbent material that can be used to reduce the concentration of trace level toxic species in various process streams or exhaust streams, such as mercury species emitted from coal-fired power plants, to low levels. In particular, there is a need for a sorbent material that can be protected and avoid deactivation caused by contact with liquid water during use. There is also a need for improved methods of reducing the concentration of trace level toxic species, such as mercury and selenium species, in both liquid and gas streams in various industrial processes, such as flue gas desulfurization and wastewater treatment systems.

BRIEF DESCRIPTION OF THE INVENTION

The present invention is directed to a polymer-protected sorbent that is at least partially covered by, or in contact with, a polymer that acts to protect or shield the sorbent from the surrounding environment, such as a liquid or gas stream within which the sorbent is being used. The sorbent is a sorbent material made of sorbent particles. The sorbent is used to remove certain chemical species, such as trace level toxic species, from a given liquid or gas, such as a liquid or gas stream in an industrial process, such as wet flue gas desulfurization process or a wastewater treatment process. The polymer permits the chemical species of interest to pass through the polymer to be captured by the sorbent, specifically the sorbent particles.

In one embodiment, the sorbent is for capturing a trace level chemical species and comprises a sorbent comprising a plurality of sorbent particles capable of capturing the trace level chemical species and a polymer covering at least a portion of the sorbent particles. In one embodiment, the sorbent particles are embedded in the polymer. In other embodiments, the sorbent particles are held in place by the polymer, for example, within a hollow polymer cylinder.

Accordingly, the polymer-protected sorbent may be of any shape. In one embodiment, polymer-protected sorbent has a sorbent material that is covered with a polymer shell in the shape of a ball, tube, sheet, cube, or other geometric shape. The polymer-protected sorbent may also have a void in its interior that provides buoyancy control. One embodiment of the invention is directed towards a polymer-protected sorbent for capturing mercury or selenium species, or both, comprising at least one solid sorbent capable of adsorbing mercury or selenium species or both and a polymer covering at least a portion of the solid sorbent.

In some embodiments, the polymer-protected sorbent can be used in a wet flue gas desulfurization system in a way that is less complicated and less expensive than either installing separate structures outside of the desulfurization unit (e.g., a carbon honeycomb) or modifying the interior of the unit (e.g., the modules of polymer sheets with embedded sorbents). Additionally, in the case of capturing mercury species, the sorbent will not risk re-emitting mercury back into the flue gas stream, as is the case with liquid absorption of oxidized mercury species. By protecting the sorbent with a polymer, the sorbent will not be quickly de-activated by contact with water or other liquids present inside the desulfurization unit. Furthermore, replacing the sorbent with new or fresh sorbent is relatively straightforward and does not involve complicated adjustments to the desulfurization unit or any other existing structure. For example, usage of polymer-protected sorbent balls made in accordance with the present invention can be modified for adaptation to any existing flue gas desulfurization unit known in the art, while maintaining the function of the protected solid sorbent.

Accordingly, in one embodiment, the present invention is directed towards a method for removing mercury species from a flue gas stream, wherein the method comprises introducing a plurality of polymer-protected sorbent, such as polymer-protected sorbent balls, into a flue gas desulfurization unit, wherein said flue gas desulfurization unit comprises a flue gas stream and a bed of slurry capable of removing sulfurous compounds from said flue gas stream, and removing mercury species from the flue gas stream using the plurality of polymer-protected sorbent balls.

In another embodiment, the present invention is directed towards a system for removing mercury species from a flue gas stream comprising a flue gas desulfurization unit and a plurality of polymer-protected sorbent balls, wherein at least a portion of the sorbent balls comprise at least one solid sorbent capable of adsorbing mercury species and a polymer covering at least a portion of the plurality of polymer-protected sorbent balls.

DETAILED DESCRIPTION OF THE INVENTION

Figure 1:
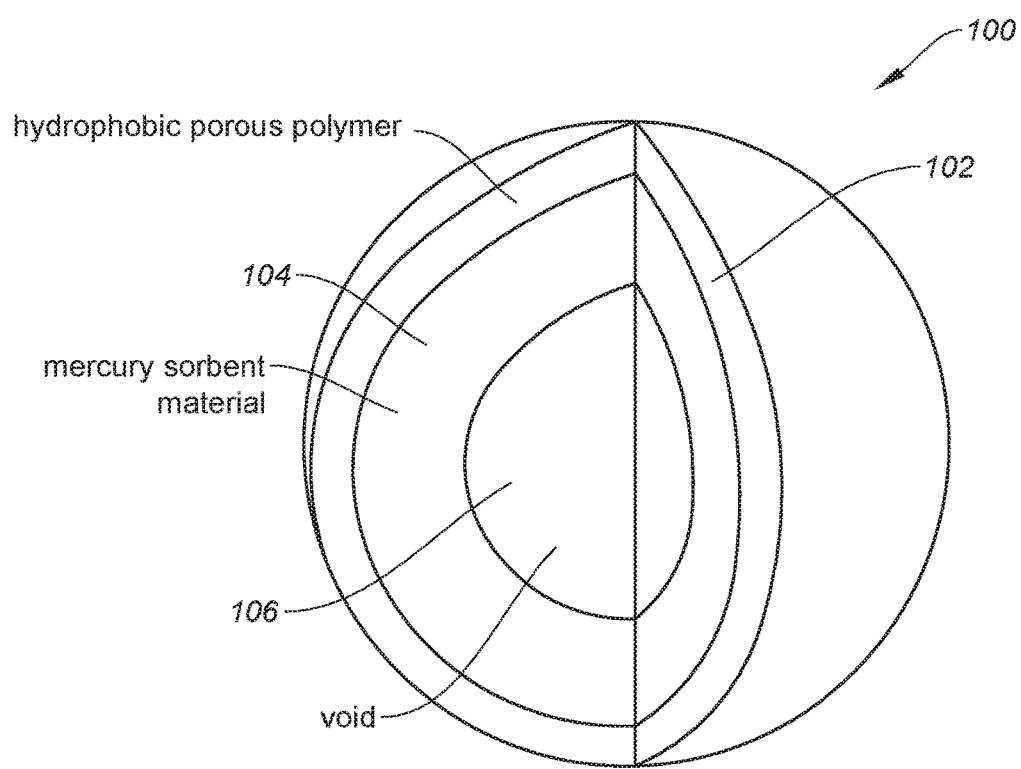
FIG. 1 is a representation of a polymer-protected sorbent ball capable of removing mercury from a flue gas stream.

The present invention is more fully described below with reference to the accompanying drawings. While the invention will be described in conjunction with particular embodiments, it should be understood that the invention encompasses a wide variety of other embodiments. The invention may take a variety of different forms, be made in a variety of different ways, and used in a wide variety of applications. As such, the invention is intended to cover alternatives, modifications, and equivalents as may be included within the spirit and scope of the invention. Accordingly, the following description is exemplary in that several embodiments are described (e.g., by use of the terms "preferably" or "for example"), but this description should not be viewed as limiting or as setting forth the only embodiments of the invention, as the invention encompasses other embodiments not specifically recited in this description. Further, the use of the term "invention" throughout this description is used broadly and is not intended to mean that any particular portion of the description is the only manner in which the invention may be made or used.

In general, the present invention is directed to a polymer-protected sorbent that is at least partially covered by, or in contact with, a polymer that acts to protect or shield the sorbent from the surrounding environment, such as a liquid or gas stream within which the sorbent is being used. The sorbent is a sorbent material made of sorbent particles. The sorbent is used to remove certain chemical species, such as trace level toxic species, from a given liquid or gas, such as a liquid or gas stream in an industrial process. The polymer permits the chemical species of interest to pass through the polymer to be captured by the sorbent, specifically the sorbent particles. Accordingly, regardless of whether the chemical species being captured is in a liquid or gas, the capture mechanism will be adsorption of the chemical species by the sorbent particles.

It should be appreciated that any sorbent material may be used, depending upon the chemical species to be captured. In some embodiments, sorbents that are suitable for gas and liquid phase capture of trace toxics include activated carbon, clays, and zeolites. It should be appreciated that a given sorbent material may be used separately or combined with other types of sorbent materials. For example, activated carbon may be used in combination with clays or zeolites or both.

It should be appreciated that the shape and size of the sorbent material may be any shape or size, and correspondingly the overall shape of the sorbent material once covered by, or in contact with, the polymer may be any shape or size. For example, the polymer-protected sorbent may take the shape of a ball, tube, sheet, cube, or other geometric shapes. It should be appreciated that, again, the sorbent material is composed of sorbent particles. Therefore, with respect to a given shape, that shape is made of sorbent particles. For example, if the sorbent material has the shape of a ball, the ball is made of sorbent particles collectively forming the sorbent material having the shape of a ball. As noted, the size of a given shape of sorbent material can be any size desired. One of skill in the art would be able to determine the appropriate shape and size depending upon the specific application in which the polymer-protected sorbent is used. As described below, the shape of the sorbent material in some embodiments is determined by the shape of the polymer being used to protect the sorbent material. In other words, the polymer material is initially formed into a given shape that provides for receipt of the sorbent particles, which when in place will inherently take the shape provided by the polymer.

In some embodiments, the sorbent material contains a void inside of the sorbent material or shape being used that allows for control over the density and buoyancy of the overall sorbent material and, accordingly, the polymer-protected sorbent. The buoyancy can be altered depending upon the application in which the polymer-protected sorbent is to be used. For example, if the polymer-protected sorbent is to be used in a gas stream, a certain buoyancy may be desirable compared to using the polymer-protected sorbent in a liquid or liquid stream.

For example, in one embodiment in which the polymer-protected sorbent is in the shape of a ball, the ball may have a void, thereby making the sorbent ball buoyant. The void may be located within the sorbent material, and in some embodiments may be located in the center of the sorbent material or ball and entirely surrounded by the solid sorbent material. It should be appreciated that the void can be of different dimensions to enable buoyancy in different environments. For example, if the user wishes to employ the sorbent balls to remove mercury primarily from a liquid environment, the void inside each of the sorbent balls could have specific measurements to enable buoyancy in that liquid environment. Conversely, if the user wishes to employ sorbent balls to remove mercury primarily from a gaseous environment, the void inside each of the balls could have specific measurements to enable buoyancy in that gaseous environment. In other words, the buoyancy of the polymer-protected sorbent can be varied. It should be appreciated that the buoyancy can be varied by varying the density of the overall sorbent material, which can include varying the size of the void or the density of the sorbent material itself. Therefore, it should be appreciated that the buoyancy can be varied as desired. For example, when used in contact with a liquid phase, the buoyancy can be altered from relatively high buoyancy such that the polymer-protected sorbent floats on top of the liquid to a relatively low buoyancy where the polymer-protected sorbent is completely submerged and to where the depth to which it is submerged may be controlled as well.

It should be appreciated that the void in most embodiments would be filled with air. However, in other embodiments, as noted above, the void may also be filled with a substance. In some embodiments, the void may be filled or partially filled with a substance, such as foam or other material, to provide additional control over the desired buoyancy of the sorbent material and, accordingly, the polymer-protected sorbent. A variety of other substances may be used to fill or partially fill the void, such as solid pieces or hollow shells of plastic, rubber, or metal; expanded polymer foams; or a fibrous material such as glass wool. In the absence of a need to control buoyancy, the void can be filled with more sorbent material.

The polymer is used to protect the sorbent material from the surrounding environment. However, it should be appreciated that the polymer can be disposed in various configurations relative to the sorbent material. In some embodiments, the polymer may completely surround the sorbent material. For example, if the sorbent material is in the shape of a ball, a polymer may be used to completely surround the ball. In this case, when using a plurality of balls in a given process, each ball may be completely surrounded by polymer. It should be appreciated, however, that in some embodiments, the polymer only surrounds a portion of the sorbent material. For example, the polymer may only surround a portion of each ball, rather than completely surrounding each ball. In other embodiments, the polymer may also completely or partially surround the sorbent material that is constructed in other shapes. Similarly, it should be appreciated that when the sorbent material has a given shape made of sorbent particles and more than one of these shapes is to be used concurrently, each of the shapes or each individual shape of sorbent material may be completely or partially surrounded by the polymer. It should be appreciated that sorbent materials having different shapes may be used concurrently or the sorbent materials may be of the same shape. Alternatively, in other embodiments, the sorbent material may include just one physical body having a given shape in which only that single body is used. In this case, the polymer may similarly, completely or partially surround the sorbent material or that single sorbent body.

In other embodiments, the polymer may be disposed as a layer that contacts one side or one portion of the sorbent material. For example, a bed of sorbent material having a given shape may have a polymer disposed on top of the bed such that the polymer only contacts the upper surface of the bed or sorbent material. In this case, the polymer may be in the shape of a layer or flat surface on top of the bed of sorbent material. In some embodiments in which the polymer is a layer on a given side of the sorbent material, the gas or liquid being treated may be passed in a direction such that it passes through the polymer layer before contacting the underlying sorbent material. Similarly, a polymer layer may be disposed under the bed of sorbent material such that the sorbent material is between the two polymer layers.

In other embodiments, the sorbent material may be disposed within the polymer itself such that the sorbent material, or at least a portion of it, is embedded within the polymer. It should be appreciated that in this embodiment, the polymer may be of any shape, such as a flat layer and the sorbent material in whatever shape may be within the shape of the polymer. It should also be appreciated that in this case, the polymer may or may not contact all of the surfaces of the sorbent material, particularly if multiple shapes of sorbent material are embedded in the polymer. For example, if the sorbent material is in the shape of a ball made from sorbent particles and multiple balls are to be embedded in the polymer, the polymer may or may not completely surround the surface of each ball, including those balls that are otherwise completely within the overall shape of the polymer. In addition, a portion of some of the balls may be exposed to the environment outside of the polymer by virtue of not being completely within the overall boundaries of the polymer shape.

As noted, the polymer allows the chemical species that is being captured by the sorbent material to pass through it and contact the sorbent particles. Therefore, in some embodiments, the polymer is porous. In other words, the polymer shell allows either liquid or gas from the environment outside the sorbent material to contact the solid sorbent. The polymer can be comprised from a plurality of hydrophobic polymers. Examples of such hydrophobic polymers include: hydrophobic porous polyethylene (PE), hydrophobic porous polypropylene (PP), polytetrafluoroethylene (PTFE), polyvinylidene fluoride (PVDF), and ethylene chlorotrifluoroethylene (ECTFE). PE or PP might be preferred for the polymer in some cases due to their lower cost compared to other polymers. The polymer may alternatively be comprised from a plurality of hydrophilic polymers. Examples of such hydrophilic polymers include: hydrophilic porous polyethylene, hydrophilic porous polypropylene, and hydrophilic polytetrafluoroethylene. The choice of polymer is dependent upon the intended use of the polymer-protected sorbent. For example, if the polymer-protected sorbent is to be used in a liquid phase environment, a hydrophilic polymer may be desirable to wick liquids to the interior of the polymer-protected sorbent and enable contact of the liquid with the sorbent. Alternatively, if the polymer-protected sorbent is to be used in a gas phase environment, a hydrophobic polymer may be desirable to avoid deactivation of the sorbent material through the adsorption of too much water.

The polymer can be applied to the sorbent material using various techniques. Once the sorbent material is constructed into the desired shape, the polymer can be applied as desired to cover the sorbent material, either completely or partially. For example, multiple pieces of the polymer material can be formed or shaped in such a way as to form sections of a shell or partial covering for the sorbent. These pieces can then be assembled around the sorbent in the proper order and secured into a continuous shell or partial covering through a welding process or the use of an appropriate adhesive. Another approach would be to form polymer shells that are continuous, except for a small opening through which the sorbent may be introduced. Once filled with the appropriate quantity of sorbent, the polymer shell can be sealed through an additional process. In one embodiment, a hollow tube of the selected polymer can be filled with sorbent particles and the ends of the tube sealed. In another embodiment, two hollow polymer tubes, one have a larger diameter than the other, can be used. The smaller diameter tube can be placed inside of the larger diameter tube, thereby creating a concentric space between the two tubes that is filled with sorbent particles, and the ends can be sealed. It should be appreciated that the inside of the smaller diameter tube can be filled with a substance or material that affects the overall buoyancy and density of the two tubes and the sorbent particles. In another embodiment, sorbent particles can be injected into a hollow ball formed from polymer material. In another embodiment, sorbent particles can be embedded in a highly porous polymer sheet by stretching the sheet to incorporate or embed the sorbent particles.

In use, the polymer-protected sorbent can be used to remove various chemical species from either the gas or liquid phase. The polymer-protected sorbent can be used in various processes to remove chemical species from the gas or liquid phase that react with the sorbent material. For example, in some embodiments, the polymer-protected sorbent can be used to remove mercury or selenium species or both from a flue gas stream, in which case the sorbent material is a material that adsorbs mercury or selenium species from the gas directly to the solid sorbent material. In other embodiments, the polymer-protected sorbent can be used to remove mercury or selenium species or both from the liquid phase of a slurry used in a wet flue gas desulfurization (wFGD), in which case the sorbent material is a material that adsorbs mercury or selenium species or both in the liquid phase. In other embodiments, the polymer-protected sorbent can be used to remove trace level toxics such as mercury, selenium, and halogen species present in the liquid phase of a wastewater stream, such as those discharged from a wFGD. In other embodiments, the sorbent material is a material that adsorbs trace level toxics in the liquid phase, such as in a liquid stream in a wastewater treatment system. However, it should be appreciated that a given polymer-protected sorbent may be used to capture more than one particular chemical species, for example, more than one trace level toxic species, such as mercury and selenium species. In addition, it should be appreciated that the polymer-protected sorbent may be made of more than one sorbent material, such as a mixture of different sorbent particles, to capture different chemical species.

In some embodiments of the invention, the polymer-protected sorbent is used to capture mercury in which case the sorbent material is activated carbon. However, it should be appreciated that any effective mercury sorbent could be used. Additionally, it the sorbent balls could be capable of capturing at least one chemical element in addition to mercury. Such an element can be, for example, selenium. Therefore, it should be appreciated that the sorbent material can be selected depending upon the chemical to be reacted with or adsorbed by the sorbent.

In one embodiment for using the polymer-protected sorbent, the polymer-protected sorbent is in the shape of a ball, in which multiple balls are used as part of a system and method for removing one or more mercury species from a flue gas stream. In one embodiment of the invention, such a system comprises a flue gas desulfurization unit and a plurality of polymer-protected sorbent balls. The flue gas desulfurization unit can be any kind of unit commonly used in the industry to remove sulfur from flue gas streams, including, but not limited to, a spray tower design or a bubbling bed design. In one embodiment, each sorbent ball includes at least one solid sorbent capable of adsorbing mercury species and a polymer shell covering at least a portion of the sorbent ball. The system can include a containment structure or cage inside the flue gas desulfurization unit in which the polymer-protected sorbent balls are placed. It should be appreciated that the containment structure or cage is located in the path of the flue gas stream, such that the flue gas stream will flow past the containment structure, thereby providing contact between the flue gas and the sorbent balls to allow the sorbent balls to capture or adsorb mercury species.

In other embodiments, the polymer-protected sorbent balls are introduced into the flue gas desulfurization unit by positioning them on top of the bed of slurry used to remove sulfur from the flue gas stream. In such embodiments, the flue gas stream contacts the slurry, resulting in slurry that has been contaminated with toxics and other species from the flue gas stream, including mercury species. The sorbent balls then contact the contaminated liquid slurry, capturing mercury species and adsorbing those species onto the solid sorbent.

In these embodiments, the sorbent balls allow for capture of mercury species in a way that is less complicated and less expensive than either installing separate structures outside of the desulfurization unit (e.g., a carbon honeycomb) or modifying the interior of the unit (e.g., the modules of polymer sheets with embedded sorbents). Additionally, the sorbent balls will not risk re-emitting mercury species back into the flue gas stream, as is the case with liquid absorption of oxidized mercury species. By protecting the solid sorbent with a polymer, the sorbent will not be quickly de-activated by water vapor present inside the desulfurization unit. Furthermore, replacing sorbent balls with new ones is relatively straightforward and does not involve complicated adjustments to the desulfurization unit or any other existing structure. Indeed, usage of the described sorbent balls can be modified for adaptation to any existing flue gas desulfurization unit known in the art, while maintaining the function of the protected solid sorbent.

The polymer-protected sorbent may also be used in wastewater treatment systems. For example, wastewater can be passed through a fixed bed consisting of a plurality of polymer-protected sorbents. After an appropriate time of exposure to the wastewater, the polymer-protected sorbents can be removed from the bed and replaced with a fresh set. The polymer-protected sorbents could also be fluidized by the flow of the wastewater, mixing rapidly with the water inside a tank or other vessel. The motion of the polymer-protected sorbents would allow them to be continuously skimmed and added to the tank to provide continuous removal of contaminants. Another method of contact could be a moving bed design, where wastewater is pumped vertically through a vessel. The polymer-protected sorbents could either move in the same direction (entrained) as the flow of wastewater or opposite to that flow (counter-current moving bed). The buoyancy of the polymer-protected sorbents could be adjusted to achieve the desired contact time between the wastewater and the polymer-protected sorbents given the particular contacting regime.

The following description of the accompanying figures is presented using polymer-protected sorbent balls as an exemplary form of the sorbent material and polymer-protected sorbent for adsorbing mercury species in a wFGD, thereby removing mercury species from a flue gas stream. However, it should be appreciated that the invention includes other polymer-protected sorbents for removing other chemical compounds, including other trace level toxic species in other industrial processes, such as wastewater treatment.

FIG. 1 shows a polymer-protected sorbent ball 100 that is in accordance with one embodiment of the invention. The outside of the sorbent ball comprises a polymer shell 102, which can be composed of a plurality of hydrophobic polymers. In some embodiments, these polymers may be a hydrophobic porous polyethylene (PE), hydrophobic porous polypropylene (PP), polytetrafluoroethylene (PTFE), polyvinylidene fluoride (PVDF), or ethylene chlorotrifluoroethylene (ECTFE). In certain instances, PE or PP might be preferred for the polymer shell 102 due to its lower cost compared to other polymers. However, it should be appreciated that any other similar, hydrophobic polymers can be used as part of the polymer shell 102. Underneath the polymer shell 102 is a solid sorbent material 104 that is made of sorbent particles. The polymer shell 102 is porous, thereby enabling any liquid or gas containing mercury species to contact the solid sorbent material 104. The solid sorbent material 104 comprises any sorbent capable of capturing mercury species, including, for example, activated carbon. Underneath the solid sorbent material 104, and encompassing the core of the sorbent ball 100 is a central void 106. The central void 106 provides buoyancy to the sorbent ball 100. It should therefore be appreciated that the central void 106 has dimensions that enable buoyancy in the specific environment in which the sorbent ball 100 is used. Thus, if a user wishes to employ the sorbent ball 100 in a predominantly liquid environment to adsorb mercury from a liquid phase, the central void 106 could have one set of measurements or physical size to enable buoyancy in that specific liquid environment. By contrast, if a user employs the sorbent ball 100 in a predominantly gaseous environment to adsorb mercury from a gaseous phase, the central void 106 could have a second different set of measurements or physical size to enable buoyancy in that gaseous environment. The measurements and dimensions of the central void 106 can therefore be adjustable based on the environment in which the sorbent ball 100 is used.

Figure 2:
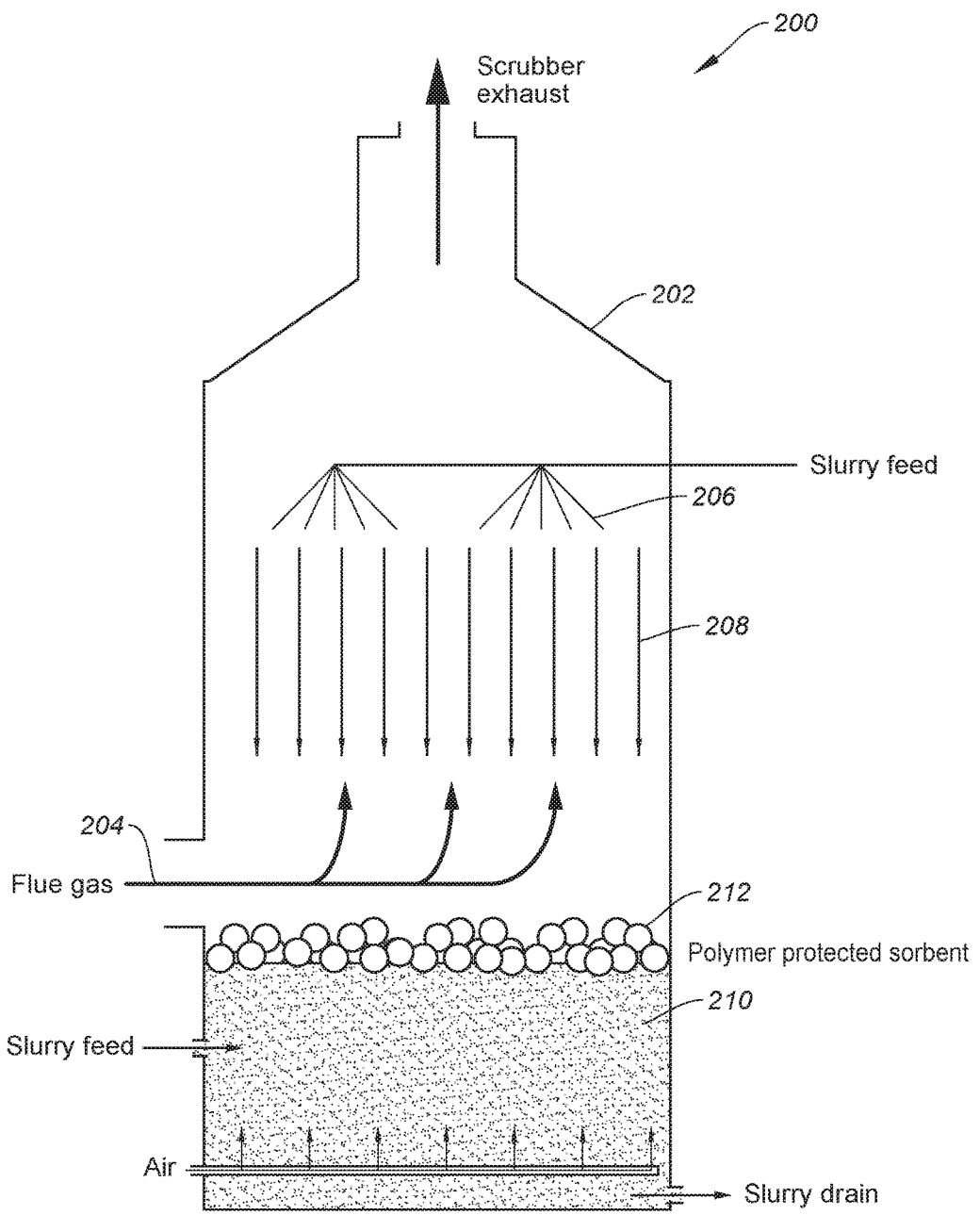
FIG. 2 is a representation of one means of utilizing a plurality of polymer-protected sorbent balls to adsorb mercury in a wet flue gas desulfurization unit with a spray tower design.

FIG. 2 shows a means 200 of utilizing a plurality of polymer-protected sorbent balls to adsorb mercury in a wet flue gas desulfurization unit, in accordance with one embodiment of the invention. A conventional wFGD unit 202 is depicted with a spray tower design, which will be familiar to those of skill in the art. A flue gas stream 204 enters the wFGD unit 202 and encounters slurry from slurry feed 206. Slurry feed 206 sprays slurry capable of removing sulfur from the flue gas stream 204. Slurry spray 208 from slurry feed 206 contacts the flue gas stream 204 and absorbs various toxics such as sulfur and mercury and falls onto slurry bed 210. A plurality of polymer-protected sorbent balls 212, as described above, are positioned on top of slurry bed 210. Thus, the slurry spray 208 that contains mercury contacts the plurality of sorbent balls 212, which then capture mercury from the slurry spray 208. In this way, the plurality of sorbent balls 212 remove mercury from the flue gas stream 204 by adsorbing mercury that is re-emitted from the liquid phase. It should be appreciated that the plurality of sorbent balls 212 can be manufactured such that they are buoyant on top of the slurry bed 210 and will therefore be optimally positioned to contact the slurry spray 208. After the plurality of sorbent balls 212 have captured mercury, a user can easily skim them off the surface of the slurry bed 210 and replace them with fresh sorbent balls. In this way, mercury can be effectively removed from the flue gas stream 204 without adding separate or additional structures to the wet flue gas desulfurization unit 202.

Figure 3:
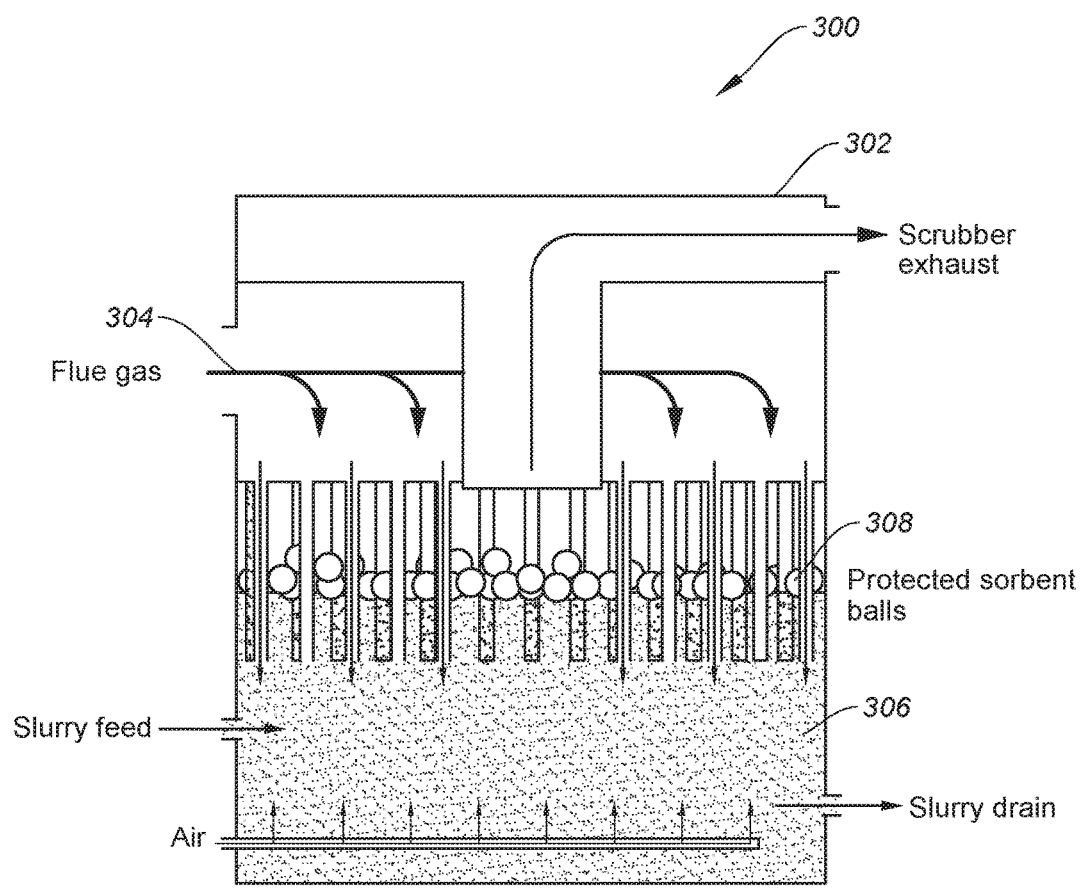
FIG. 3 is a representation of one means of utilizing a plurality of polymer-protected sorbent balls to adsorb mercury in a wet flue gas desulfurization unit with a bubbling bed design.

FIG. 3 shows another means 300 of utilizing a plurality of polymer-protected sorbent balls to adsorb mercury in a wet flue gas desulfurization unit, in accordance with another embodiment of the invention. A conventional wFGD unit 302 is depicted with a bubbling bed design, which will be familiar to those of skill in the art. A flue gas stream 304 enters the wFGD unit 302 and is projected downward into a slurry bed 306. The flue gas stream 304 enters the slurry bed 306, depositing toxics such as sulfur and mercury into the slurry bed 306. A plurality of polymer-protected sorbent balls 308, as described above, are positioned on top of slurry bed 306. Thus, the plurality of sorbent balls 308 contacts slurry in the slurry bed 306 that is contaminated with mercury, enabling the sorbent balls 308 to capture mercury. In this way, the plurality of sorbent balls 308 remove mercury from the flue gas stream 304 by adsorbing mercury directly from the flue gas stream or adsorbing mercury re-emitted from the slurry in the slurry bed 306. Again, it should be appreciated that the plurality of sorbent balls 308 can be manufactured such that they are buoyant on top of the slurry bed 306 and will therefore be optimally positioned to contact mercury-contaminated slurry. After the plurality of sorbent balls 308 have captured mercury, a user can easily skim them off the surface of the slurry bed 306 and replace them with fresh sorbent balls. In this way, mercury can be effectively removed from the flue gas stream 304 without adding separate or additional structures to the wet flue gas desulfurization unit 302.

Figure 4:
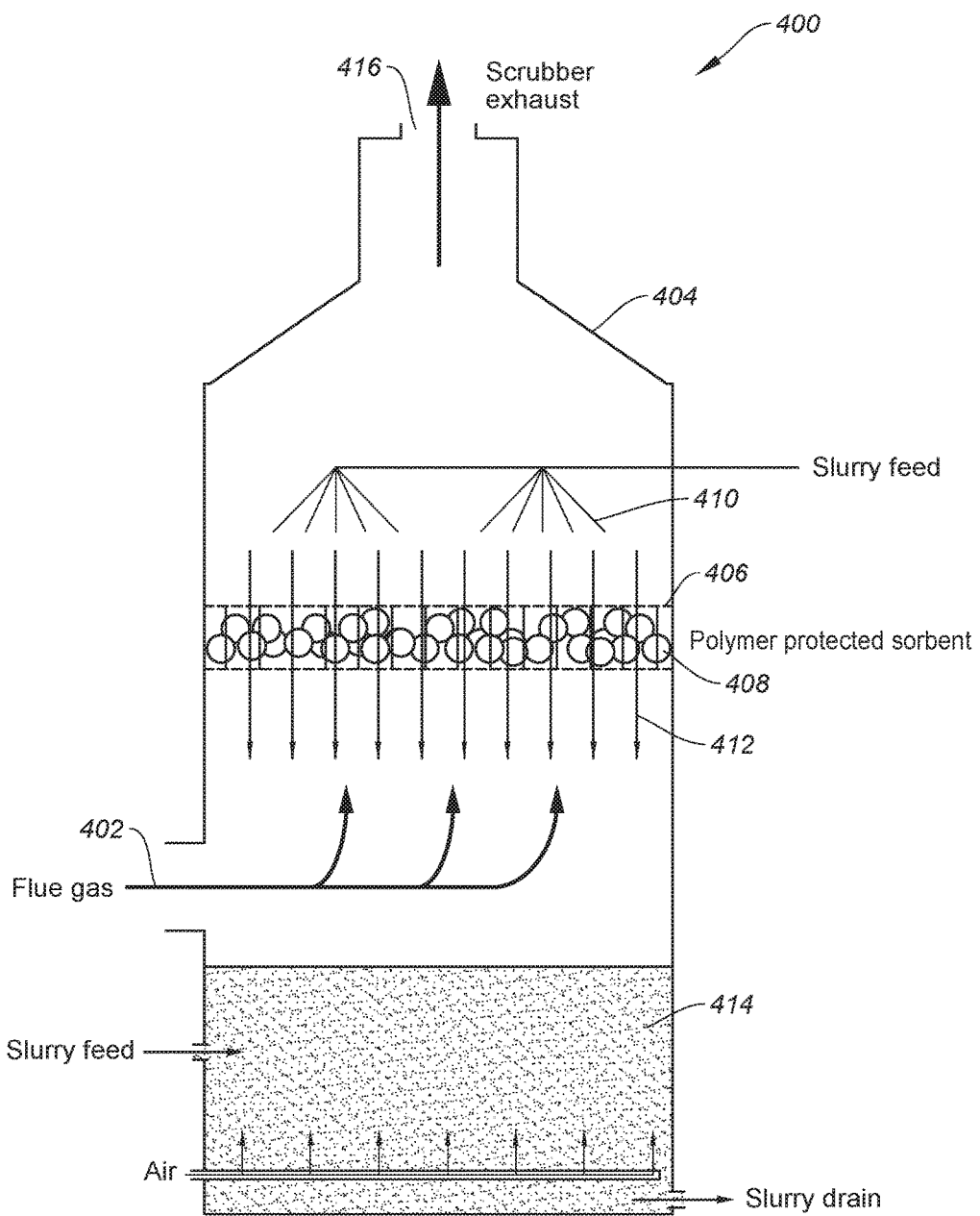
FIG. 4 is a representation of one means of utilizing a plurality of polymer-protected sorbent balls to adsorb mercury from a flue gas stream.

FIG. 4 shows a means 400 of utilizing a plurality of polymer-protected sorbent balls to adsorb mercury in a wet flue gas desulfurization unit, in accordance with yet another embodiment of the invention. A flue gas stream 402 enters a wet flue gas desulfurization unit 404 and flows past a containment structure 406, such as a fixed bed structure. The containment structure 406 contains a plurality of polymer-protected sorbent balls 408. The sorbent balls 408 can therefore adsorb mercury directly from the flue gas stream 402. Additionally, the containment structure 406 can be positioned vertically below slurry feed 410 to allow for additional capture of mercury from a liquid phase. When slurry spray 412 from slurry feed 410 contacts the flue gas stream 402, toxics such as mercury can be mixed with the slurry spray 412 in a liquid phase. Slurry spray 412 that is contaminated with mercury can then contact the plurality of sorbent balls 408 positioned in the containment structure 406. Thus, the plurality of sorbent balls 408 can also capture mercury in a liquid phase from the slurry spray 412. In this embodiment, the plurality of sorbent balls 408 can both adsorb mercury re-emitted from the liquid phase and adsorb mercury from the gas phase. Once the plurality of sorbent balls 408 has captured mercury, they can be removed from the wet flue gas desulfurization unit 404 by releasing them from the containment structure 406. The plurality of sorbent balls 408 can then fall on to the surface of a slurry bed 414, from where they can be skimmed, removed, and replaced.

It should also be appreciated that the density of each of the plurality of sorbent balls 408 can be adjusted so that the sorbent balls fall vertically downwards as the flue gas stream 402 rises upwards. In such embodiments, a containment structure 406 would be unnecessary and the plurality of sorbent balls 408 can be added into the wet flue gas desulfurization unit 404 at the top of the scrubber exhaust 416.

As noted, the foregoing descriptions of specific embodiments of the present invention are presented for purposes of illustration and description. They are not intended to be exhaustive or to limit the invention to the precise forms disclosed as many modifications and variations are possible in view of the above teachings. For example, some of the above embodiments are described in the context of a combustion device, such as a coal-fired boiler, and the resulting flue gas. However, the various embodiments of the invention are applicable to any gas or liquid stream from which a pollutant or contaminant, such as mercury species, selenium species, halogen-containing compounds, and other trace level toxic compounds, needs to be removed. Furthermore, some of the above embodiments are described in the context of usage in a wet flue gas desulfurization unit. However, the described sorbent balls can be used in a separate unit such that a flue gas stream contacts the sorbent balls without the presence of any slurry or desulfurization compounds or apparatuses. In other words, the sorbent balls need not be used in combination with removal of sulfurous compounds; the sorbent balls can be used to remove mercury from the flue gas stream independent of any desulfurization. Additionally, as mentioned above, the sorbent balls can be used to remove other pollutants or contaminants in addition to mercury, such as selenium species and halogen-containing compounds from gas and liquid streams via adsorption on the sorbent material protected by the polymer.

What is claimed is:

1. A sorbent for capturing a trace level chemical species, comprising:
    a sorbent having a single body of a predetermined geometric shape and an outer surface and comprising a plurality of sorbent particles capable of capturing a chemical species, wherein the predetermined geometric shape of said sorbent is formed by said plurality of sorbent particles; and
    a polymer covering at least a portion of the outer surface of said sorbent, wherein said polymer conforms to and has a corresponding shape of the portion.

2. The sorbent of claim 1, wherein at least a portion of said sorbent particles each comprise a void within said sorbent particle.

3. The sorbent of claim 2, wherein said void is at least partially filled with a substance.

4. The sorbent of claim 3, wherein said substance is selected to provide a predetermined buoyancy.

5. The sorbent of claim 2, wherein said sorbent is more buoyant than said sorbent without the void.

6. The sorbent of claim 1, wherein said polymer is porous.

7. The sorbent of claim 1, wherein said polymer comprises a plurality of hydrophobic polymers.

8. The sorbent of claim 7, wherein said plurality of hydrophobic polymers is selected from the group consisting of: hydrophobic porous polyethylene, hydrophobic porous polypropylene, polytetrafluoroethylene, polyvinylidene fluoride, ethylene chlorotrifluoroethylene, and combinations of the foregoing.

9. The sorbent of claim 1, wherein said polymer comprises a plurality of hydrophilic polymers.

10. The sorbent of claim 9, wherein said plurality of hydrophilic polymers is selected from the group consisting of: hydrophilic porous polyethylene, hydrophilic porous polypropylene, and hydrophilic polytetrafluoroethylene, and combinations of the foregoing.

11. The sorbent of claim 1, wherein the chemical species comprises a mercury species.

12. The sorbent of claim 1, wherein the chemical species comprises a selenium species.

13. The sorbent of claim 1, wherein said sorbent particles are capable of capturing at least two different chemical species.

14. The sorbent of claim 1, wherein said sorbent particles are selected from the group consisting of activated carbon, zeolites, clay, and combinations thereof.

15. The sorbent of claim 1, wherein the single predetermined geometric shape of said sorbent has a shape selected from the group consisting of balls, tubes, sheets, and cubes.

16. A sorbent for capturing a trace level chemical species, comprising:
    a polymer body having a shape that forms a cavity;
    a plurality of sorbent particles disposed within said cavity.

17. The sorbent of claim 16, wherein said plurality of sorbent particles has a shape.

18. A sorbent for capturing a trace level chemical species, comprising:
    a sorbent comprising a plurality of sorbent particles capable of capturing a chemical species, wherein said plurality of sorbent particles has a shape; and
    a polymer covering at least a portion of said shape of said sorbent particles and conforming to said portion of said shape.

* * * * *